United States Patent

Cates et al.

[11] Patent Number: 5,284,433
[45] Date of Patent: Feb. 8, 1994

[54] SPRING-LOADED SELF-ADJUSTING MELT CUTTER

[75] Inventors: Allen A. Cates; Donald R. McMullen, both of Orange, Tex.

[73] Assignee: E. I. Du Pont de Nemours and Company, Wilmington, Del.

[21] Appl. No.: 22,209

[22] Filed: Feb. 25, 1993

[51] Int. Cl.⁵ .................................. B29B 9/06
[52] U.S. Cl. ........................... 425/313; 425/311
[58] Field of Search ............ 264/142; 425/307, 168, 425/311, 313

[56] References Cited

U.S. PATENT DOCUMENTS

| | | | |
|---|---|---|---|
| 3,196,487 | 7/1965 | Snelling | 425/168 |
| 3,266,090 | 8/1966 | Gosney | 425/67 |
| 4,019,414 | 4/1977 | Thomas, Jr. et al. | 83/356.3 |
| 4,021,176 | 5/1977 | Dettmer et al. | 425/313 |
| 4,179,255 | 12/1979 | Hale | 425/67 |
| 4,260,356 | 4/1981 | Fujiwara et al. | 425/311 |
| 4,569,809 | 2/1986 | Baggett | 264/40.1 |
| 4,614,307 | 9/1986 | Lauser | 241/101.4 |
| 4,728,276 | 3/1988 | Pauley et al. | 425/67 |
| 4,874,307 | 10/1989 | Comper et al. | 425/311 |
| 4,978,288 | 12/1990 | Ellwood | 425/311 |
| 5,059,103 | 10/1991 | Bruckman et al. | 425/67 |

FOREIGN PATENT DOCUMENTS 1456506 11/1976 United Kingdom .
1514160 6/1978 United Kingdom .

Primary Examiner—Jay H. Woo
Assistant Examiner—James P. Mackey
Attorney, Agent, or Firm—Peter A. Fowell

[57] ABSTRACT

An improved rotary melt cutter capable of accommodating a wide variation in polymer melt viscosities and melt characteristics is provided by use of a controlled pressure spring mechanism which operates in conjunction with each of several independently articulated knife-assemblies of the cutter. The knife-blade cutting-edges thereby maintain near-zero clearance from an extruder die-face from which polymer strands are being extruded. The cutter operates more effectively with less interruption and fouling than cutters of similar design but which utilize hydraulic pressure as the means of maintaining near-zero clearance.

3 Claims, 4 Drawing Sheets

SPRING-LOADED SELF-ADJUSTING MELT CUTTER

BACKGROUND OF THE INVENTION

1. Field of the Invention

This invention relates to an apparatus for cutting molten strands of extruded thermoplastic into pellets.

More specifically, the invention is an improved rotary cutter apparatus whose knife-blades cut strands of molten polymer extruding from a die, each knife-blade cutting-edge being independently maintained in contact with the die-face by means of a controlled spring mechanism.

2. Description of Related Art

Polymer pellets or granules are commonly prepared by cutting strands of polymer emerging from an extruder die. This may be done by first allowing the strand of molten polymer to solidify or by cutting the strand while it is molten. The latter has been referred to as a die-face cutter or melt cutter or melt cutter apparatus. Solid polymer strands are cut some distance away from the die-face, after they have solidified, but molten polymer strands are conveniently cut by a knife-blade whose cutting-edge is in contact with the die-face while moving across it.

Melt cutters are commonly of rotary design. Generally, but not necessarily, the extruder die-face and the cutter are housed within cooling water, so that cut molten pellets quickly solidify and don't stick together. High capacity can be achieved by such underwater operation.

One key to good cutting action in such cutters is the maintenance of low, essentially zero clearance between the cutting-edges and the die-face. If the knife-blade position is rigidly fixed, die contraction due to changes in water and polymer melt temperature, die warping, and other factors could allow the clearance to become significantly greater than zero or, by contrast, die expansion could cause excessive die-face and knife-blade cutting-edge wear. When the clearance becomes significantly greater than zero, cutting action is inferior or even totally interrupted. Lack of smooth continuous cutter operation greatly affects productivity. Many different designs and mechanisms, usually quite complex, have been used to achieve this knife-blade cutting edge/die-face adjacency.

U.S. Pat. No. 4,179,255 (Hale), discloses a rotary melt cutter operating in association with a rotating shaft structure. The cutter has several knife-assembles each of which have two movable joints. Hydraulic pressure on knife-blades of the knife-assemblies urges the knife-blades towards the die concomitant with rotation of one of those joints. Several features of the Hale design are also part of the improved cutter of this invention and the patent is herein incorporated by reference.

U.S. Pat. No. 4,978,288 (Elwood) discloses a rotary cutter with an improved pellet transport system. The cutter has an annular chamber in which blade means comprising a knife-holder having articulated self-adjusting spring-loaded knives are disposed. The blades can pivot about two mutually transverse axes and are urged against the pellet plate by the spring.

U.S. Pat. No. 4,019,414 (Thomas, Jr. et al.) discloses a rotary melt cutter operating under water, having each of several cutting knives attached in cooperation with a spring adjacent to each knife, to a rotating structure to form a cutting assembly. Wear on the blade is reduced by means of a cam action which moves each blade radially, to expose a continually differing part of each blade to a cutting position.

U.S. Pat. No. 3,196,487 (Snelling) discloses a rotating cutting assembly which employs a hub structure. The rotating knife portion of the assembly is urged towards the die-face preferably by a single spring positioned centrally along the axis of the drive-shaft.

U.S. Pat. No. 3,266,090 (Gosney) discloses an improvement on the Snelling structure. It employs the same centrally positioned spring means, and also provides limited swivel means of the whole assembly with respect to the plane of the die-face.

U.S. Pat. No. 4,569,809 (Baggett) discloses an alignment jig mounted on a cutter assembly shaft, and its method of use to determine and adjust perpendicularity of a drive-shaft assembly controlling the cutter, with the die-face. Part of the jig includes a rod with a scraping edge to remove polymer drool, the rod being urged to the die-face with means such as a spring.

U.S. Pat. No. 4,614,307 (Lauser) also discloses a rotary melt cutter with axial adjustment of the cutting head.

U.S. Pat. No. 4,728,276 (Pauley et al.) discloses a rotary melt cutter which provides bearing means supporting the drive-shaft for axial adjustment. The adjustment means includes a support platform and support plate with a plurality of independently adjustable spring support members interconnecting them.

U.S. Pat. No. 4,874,307 (Comper et al.) discloses a rotary melt cutter where during operation, wear is eliminated because the cutting edges of the blades do not touch the die-face, but are spaced from it by a thickness at least equal to that of a hydrodynamic fluid film generated during operation.

U.S. Pat. No. 5,059,103 (Bruckmann et al.) discloses yet another type of spring-loaded hub structure interconnecting a drive-shaft and a cutter blade assembly.

U.S. Pat. No. 4,260,356 (Fujiwara et al.) discloses another melt cutter having a rotating shaft structure with at least one cutting tool with a blade, the shift being urged towards the extrusion block by a single elastic member such as a spring. The cutting tool is connected to the shaft using a universal joint which allows tilting of the cutting blades with respect to the extrusion block.

U.S. Pat. No. 4,021,176 (Dettmer et al.) discloses another design for a cutter apparatus with cutting knives resiliently tensioned towards the face of the die.

Each of these patents discloses different means of achieving conformity of knife-blades and die-face. Many incorporate various spring arrangements. However, none disclose the specific structural arrangements of the present invention.

In recent years, polymer compositions have become more complex and varied, and the nature of polymer melts is correspondingly more varied. Greater variations in viscosity and in other melt characteristics, resulting from new and varied additives, have become the norm. The Hale cutter, though adequate for the simpler compositions of the past, has been found inadequate to cope with many of these new compositions. Disruption of smooth continuous cutting often occurs. This can occur when lower cutter speeds are necessitated, because the hydraulic pressure is lower. Uneven polymer extrusion rate and surging can also cause disruption.

While changes in extruder die support and design, and use of new structural materials for extruders and dies can reduce all of the above problems, such an approach is expensive, involving major new equipment. There is a need for an improvement to rotary cutters, especially of the Hale design, which provide much greater control of knife-blade cutting-edge/dieface clearance, in order to provide good and uniform cutting of a wide variation of polymeric compositions.

SUMMARY OF THE INVENTION

The present invention provides an improved rotary melt cutter apparatus for cutting one or more molten continuously extruded strands extruding through holes at the face of a die, into pellets, the apparatus adapted to be driven by a continuously rotating drive-shaft. In an apparatus of the type comprising:

a head axially attachable to the drive-shaft so that it rotates with, and acts as an extension of the drive-shaft; a plurality of knife-assemblies attached to the head so that they rotate with the rotation of the drive-shaft, each knife-assembly having a curved or angled drive-rod portion having a first and second end, the first end radially connected to the head in a way that rotational movement of the knife-assembly about the axis of the first drive-rod portion end is available, a knife-holder portion axially and unconstrainedly rotatably connected to second end of the drive-rod portion, and a knife-blade with an elongated cutting-edge, which is positioned adjacent to the die-face along its length during cutter operation, attached to the knife-holder portion; the improvement comprises:

a plurality of spring means, one for each knife-assembly, operating independently to urge rotational movement of each knife-assembly, in a direction whereby a near-zero clearance between the knife-blade cutting-edge and die-face is continuously maintained;

the rotational ability of the knife-holder portion with respect to the drive-rod portion of the knife-assembly providing additional conformity between the knife-blade cutting-edge and the die-face;

the knife-blade movements associated with the two rotational abilities resulting in continuous smooth cutting operation of the molten strands.

DETAILED DESCRIPTION OF THE INVENTION

Figure 1:
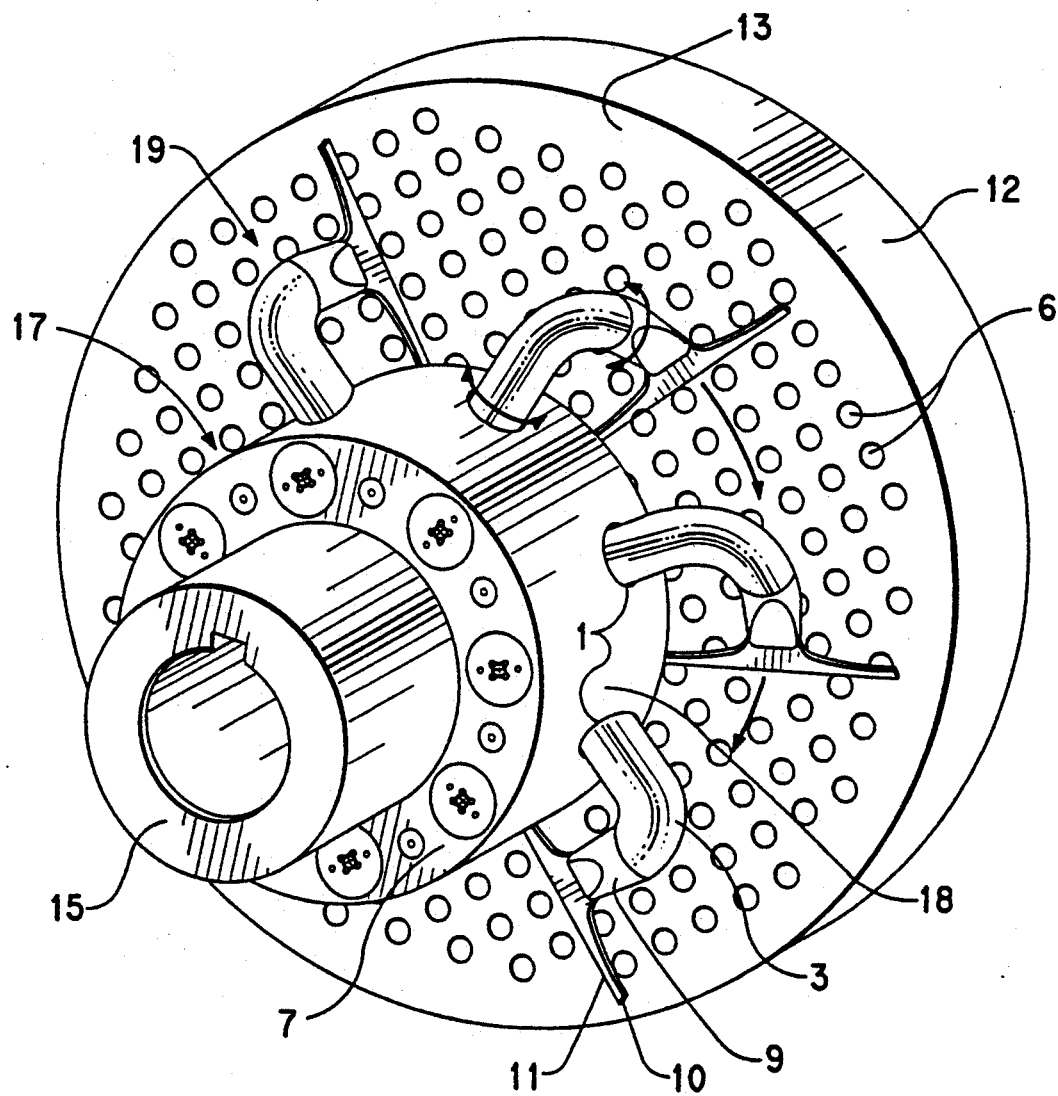
FIG. 1 is a perspective view of the assembled cutter apparatus showing its position in relation to the drive-shaft and die-face.

The rotary cutter of this invention is an improvement of the Hale rotary cutter. The Hale cutter is described below in sufficient detail to enable the improvement to be clearly understood.

In the related art there is almost no consistent terminology. A cutter in one patent may be a knife-assembly in another, and so on. The terminology used in this application is slightly different from that of Hale. It has been used in an attempt to achieve greater clarity. Any description of elements of the Hale invention conforms with terms used for the present invention.

The Hale cutter consists of an apparatus having rotating knife-assemblies which cut molten polymer extruded from the face of an extruder die into pellets. The apparatus and die are preferably housed in an underwater enclosure. When so housed, a rapid flow of water cools and solidifies the pellets and conveys them away for subsequent collection. The structure attempts to provide continuous ability for the knife-blade cutting-edges to conform to the die-face providing smooth cutter operation and reducing wear. This conforming is achieved by availability of two different rotational movements each in a different joint in the cutter apparatus. These availabilities or capacities provides ability for the joints to rotate to and fro and this provides the conformity. (This rotational ability, of course, is not to be confused with the continuous rotation of the cutter itself).

In this application, the terms 'free' and 'unconstrained' rotation or rotational ability mean rotation without a force acting within the cutter itself, such as would be provided by spring action, urging rotation. The term 'limited' rotation or rotational ability means that the angle through which rotation is possible is limited. The terms are mutually exclusive, so that limited rotation may be strained or unconstrained and unconstrained rotation may be limited or not limited.

The first rotational ability is at the joint of the knife-assembly with a head, a preferably cylindrical structure, attached along its axis to the drive-shaft which rotates to operate the cutter. The head is essentially a removable extension of the drive-shaft suitable for attaching the knife-assemblies. The knife-assemblies could be attached directly to the drive-shaft, and in the Hale patent it is not clear whether they do so or not. However, it is more convenient to have a removable head as an extension of the drive-shaft. The second rotational ability is at a joint within the knife-assembly itself, the joint between the knife-holder portion and drive-rod portion of the knife-assembly. The two rotational abilities allow different but complimentary movements of the knife. The first is associated with the overall clearance between the knife-blade cutting-edge and the die-face, reducing it to near-zero when the cutter is in operation. Near-zero means that contact exists, and there is no discernible clearance. The second allows rotation of the knife-holder portion to accommodate any die warping. In the cutter of the present invention, the second of these rotational abilities is the same as in the Hale cutter apparatus. The first rotational ability, is controlled in a completely different way however, and this is the subject of the present invention. To understand the improvement of the present invention, it will be helpful to explain clearly the operation and problems associated with the Hale design.

After set up, in the Hale design, the knife-assemblies are positioned such that the knife-blades are at a distance from the die-face. When cutter rotation is started, hydraulic pressure acting on the knife-blades, which act like paddles, forces them against the die-face, this movement being possible because of and in association with the rotational ability of the joints between the knife-assemblies and the head. The rotational ability of this joint is deliberately limited to a small arc so that the knife-blade always points slightly towards the die-face. Without this limit, the blades could become positioned so that on start up, hydraulic pressure could act on the wrong side of the knife-blade, forcing it away from rather than towards the die-face. During normal cutter operation, when the knife-blade cutting-edges are in contact with the die-face, lateral movement of the knife-blades, that is, parallel to the drive-shaft axis, occurs only when needed to accommodate die expansion or contraction. However, with some newer polymer materials, surging and uneven pressure across the die often caused one or more knife-blades to move significant distances away from the die-face, disrupting the water flow and affecting all of the knife-blades, and the whole cutting operation. The ability of the knife-blades to move away from the die-face, because of the rotational ability of the joint, even though limited, then becomes a major liability rather than an advantage.

In the present invention, hydraulic pressure on the knife-blades is no longer needed for knife-blade/die-face contact. In fact it is preferred to reduce or even eliminate any hydraulic pressure by reducing the surface area of the knife-blades, so they no longer act like paddles. Instead of potentially variable hydraulic pressure acting directly on the knife-blades, permanent and constant pressure acts indirectly on them as a result of controlled spring mechanisms acting in conjunction with the first rotational ability. In addition, reduction in water turbulence leads to smoother overall pellet movement. Typical water flow over the cutter and die, to cool and convey pellets is of the order of 300 gallons a minute, and any turbulence in smooth flow can lead to less efficiency in the whole operation.

A separate spring mechanism is associated with each knife-assembly, and each knife-assembly, as in the Hale design, is independently articulated. The arrangement of independently articulated assemblies allows for any surging and uneven pressure in one area of the die. Now, any temporary loss of contact of a knife-blade and the die-face is soon remedied by the combination of cutting by other unaffected blades and the spring pressure on the affected knife-blade. Movement in one knife-assembly does not significantly affect the others.

While spring mechanisms located outside the head rather than housed in it could be employed, as some preliminary experiments have shown, the spring mechanisms are preferably housed within the head. This has the advantage of operational simplicity, and prevents parts of the spring mechanisms, which are readily enclosed by a cover, being exposed to jamming from stray polymer particles such as 'fines' (small pieces of polymer resulting from inefficient cutting into neat pellets). However, some care is necessary to ensure a level of pressure on the knife-blade cutting-edge which provides for effective near-zero clearance with the die-face without excess which could cause die-face or knife-blade wear.

The preferred spring mechanism controlling each knife assembly comprises a coiled spring operating in combination with a tensioner, tensioner-pin and tensioner-guide, housed within the head as described below.

Figure 3:
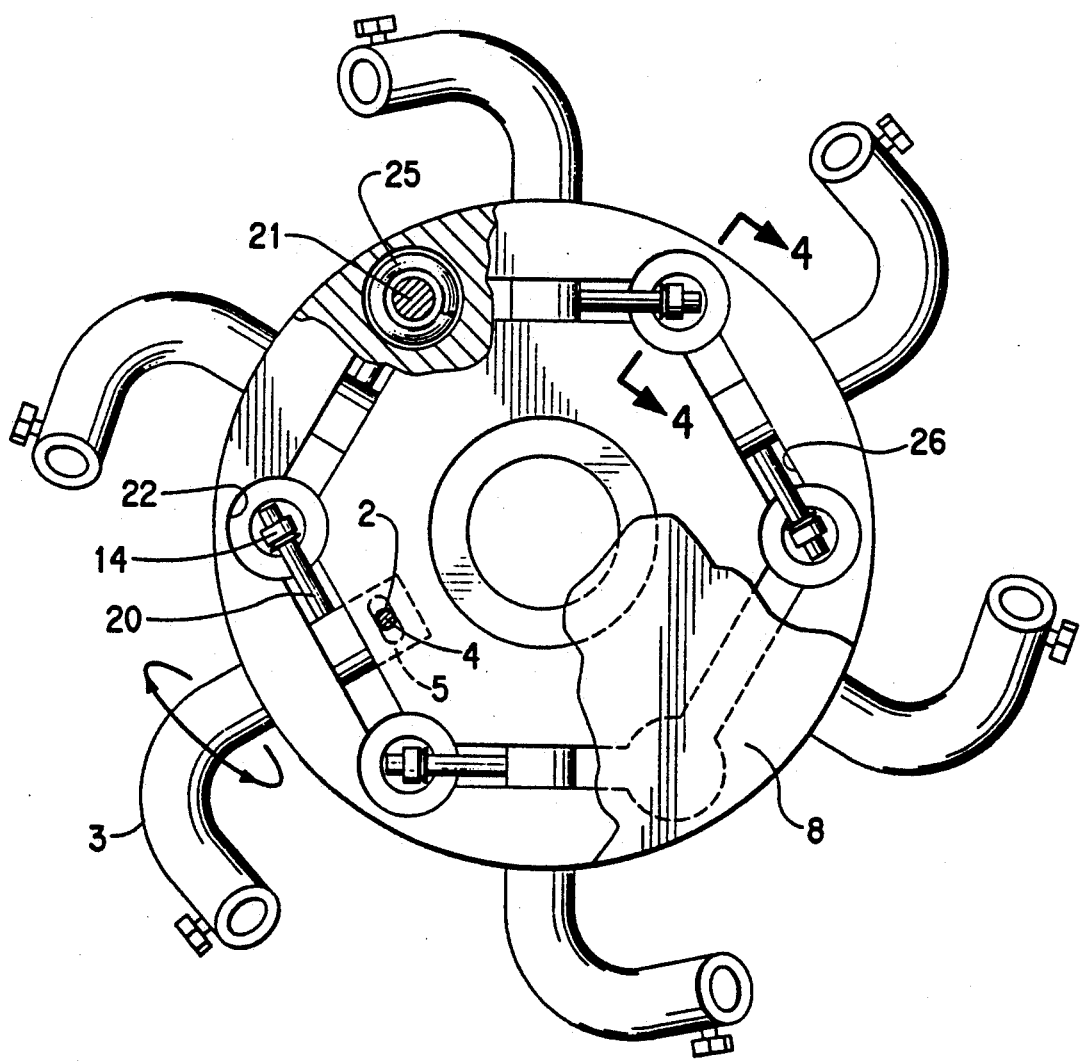
FIG. 3 shows an end view of the melt cutter apparatus looking towards the drive-shaft, in part section, without the knife-holder portions of the apparatus.

FIG. 1, shows a perspective view of the entire melt cutter apparatus (17), showing the drive-shaft (15) to which it is attached, the die (12), and the knife-blades (10) touching the die-face (13). The melt cutter apparatus has a head (18), preferably cylindrical, and preferably larger in diameter than the drive-shaft, detachably attached along the common axis to the drive-shaft. The head houses the parts which connect with and control movement of the knife-assemblies (19). The head has cylindrical holes (1) that are preferably but not necessarily radial, positioned near the end of the head away from the drive-shaft. For some of the following features, reference to FIG. 3 is also necessary. The head preferably but not necessarily also has smaller axial holes (2 in FIG. 3) centered radially at, and in the middle of the cylindrical holes. The knife-assemblies have a drive-rod portion (3) and a knife-holder portion (9). The drive-rod portions, which preferably but not necessarily are also cylindrical, are positioned in the cylindrical holes, and are suitably retained therein so that preferably, but not necessarily, only a limited angle of rotation of the drive-rod portions in the cylindrical holes is possible. The angle through which the drive-rod portion may rotate may be limited for example by dowel-pins (4 in FIG. 3) pressed into the axial holes, which are aligned with elongated holes (5 in FIG. 3) in the drive-rod portion near its end inserted in the head. The drive-rod portion is preferably, but not necessarily curved or angled such that the outer end axis is in the general direction of the knife-blade rotation. The knife-holder portion (9) is attached to the drive-rod portion and is able to freely rotate in the direction of the arrow shown, the axis of rotation being the axis of the drive-rod portion at the point of connection. The knife-holder portion has a knife-blade (10) with an elongated cutting-edge (11) that is slanted towards, and generally on a radius with the die-face. The cutting-edge of the knife-blade is adjacent to the die-face during cutter operation. The die-face is preferably but not necessarily planar. The cutter apparatus is adaptable to rotation in either direction by changing the knife-assemblies to mirror images of themselves. Alternative rotation can reduce any unevenness in the low level of wear of the die-face which may occur.

Figure 2:
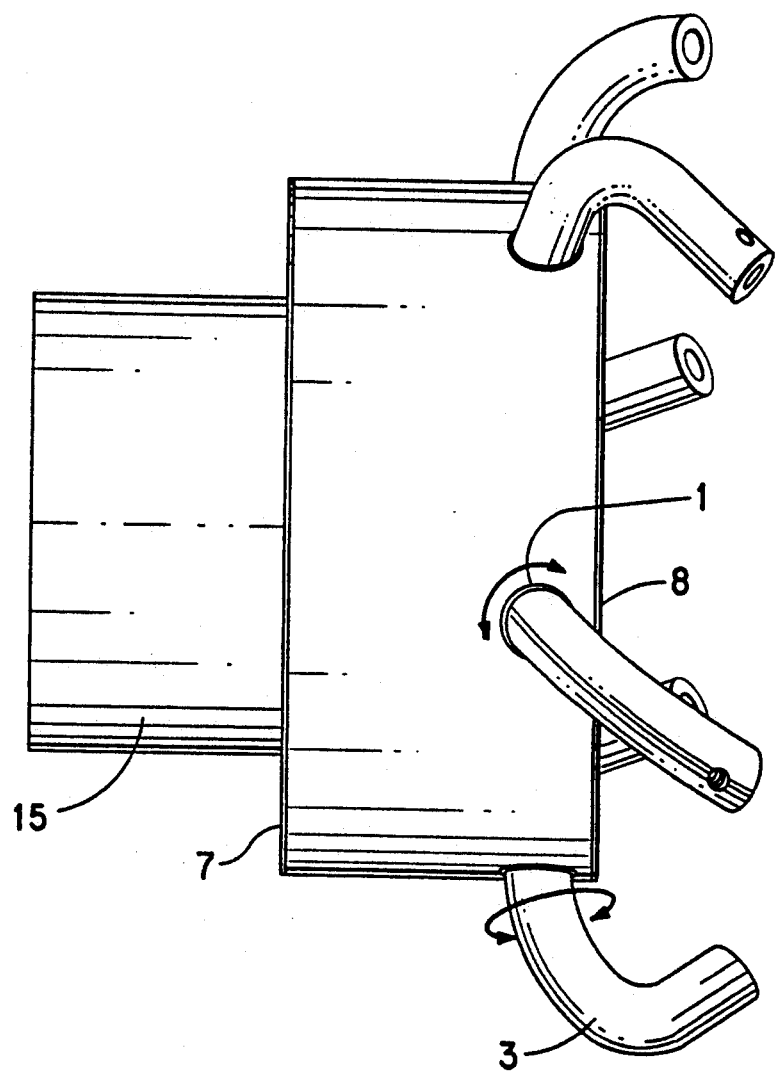
FIG. 2 is a side view of the apparatus without the knife-holder portions attached.

FIG. 2 is a side view showing the preferably curved drive-rod portions without the knife-holder portions attached.

Figure 4:
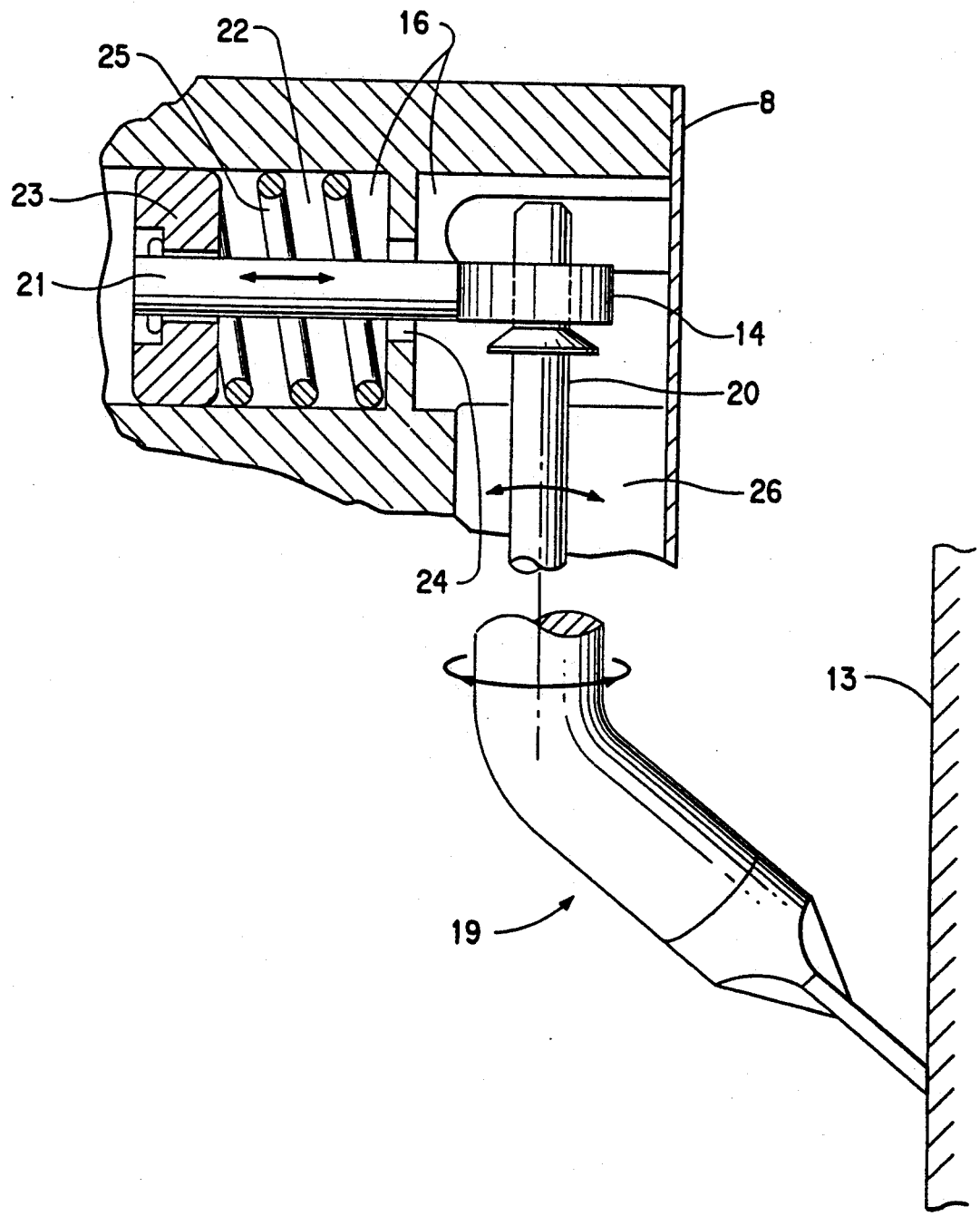
FIG. 4 shows a side view section of a portion of the apparatus showing the spring mechanism.

FIG. 3 is an end view, partly in section, looking towards the drive-shaft, and shows in section the axial holes (2), elongated holes (5) and dowel-pins (4) previously referred to, provided in the preferred embodiment to limit the rotational ability of the drive-rod portion to a small angle. It also shows the position of the tensioner-pin (20) seated in a groove (26) cut out of the head. FIGS. 4 shows a sectional side view of a part of the cutter showing the preferred design of the spring mechanism and its operation.

Referring to FIGS. 3 and 4, one end of a tensioner-pin (20) is attached to the drive-rod portion of the knife-assembly. It is seated in the groove (26), perpendicular to its axis, and roughly parallel to a tangent to the preferably cylindrical outer wall of the head at the point the drive-rod portion is attached. The other end of the tensioner-pin is positioned through a loop (14) which forms one end of a tensioner (21). The tensioner is axially positioned in a cylindrical chamber (22) within the head, the chamber being axially parallel to the head and drive-shaft axis (and also to the axial holes through which the dowel-pins, if present, are inserted). The chamber has three sections, two of wider diameter (16) either side of a narrower connecting restricting section (24). The outer end of the tensioner has a tensioner-guide (23) coaxially surrounding it and locked onto it when assembled. The diameter of the guide is just sufficient to fit in the wider diameter section of the chamber closest to the drive-shaft, but also to be slidable within it. Within this section of the chamber, between the guide and restricting section is a spring (25) also coaxially surrounding the tensioner. The spring is under compression when the cutter is assembled, maintaining permanent pressure urging the knife-blade towards the die-face. Any reverse pressure on the knife-blade cutting-edge, due to expansion of the die is accommodated by slight movement of the tensioner and spring. Expansion and contraction is typically, at worst, of the order of one hundredth of an inch, but without the possibility of repositioning of the cutting-edge, such a change could cause major disruption or wear.

The cutter apparatus can be readily assembled and disassembled. To assemble, the appropriate ends of the drive-rod portion of the knife-assemblies are inserted into the cylindrical holes in the head. Each is then rotated to allow insertion of the tensioner-pin. The tensioner is then looped over, or otherwise pivotally connected to the end of the tensioner-pin and positioned into the cylindrical chamber. For limiting the angle of rotation, which is preferred, a dowel-pin is installed through the axial hole in the head into the elongated hole in the drive-rod portion. The dowel-pin also serves to generally position and hold the knife-assembly. The spring and then the tensioner-guide are then placed round the other end of the tensioner by pushing the tensioner through the tensioner-guide. The guide is secured at the end of the tensioner by a locking pin protrusion on the end of the tensioner. Inner coverplate halves (7 in FIG. 1) are then installed preferably using silicone sealant as a gasket. The assembled melt cutter is then installed on the drive-shaft and the outer cover-plate (8) then placed on and similarly sealed.

The rate of pellet production depends on several factors. As noted, operation under water is preferred to provide rapid pellet cooling, to prevent sticking and jamming, generally allowing high capacity operation. Faster total polymer extrusion rates will necessitate faster cutter rotation or more holes per surface area, or more holes over a larger area together with a longer knife-blade. A satisfactory combination was as follows: rotation speeds of about 1000 rpm, knife-blades from 2 to 5 inches long, die holes (6) about one tenth inch in diameter, positioned in several rectangular arrays around the die-face; holes in the arrays ¼ to ⅜ inches apart, the arrays starting about 3 inches from the central axis. Many other combinations however should be possible and may be beneficial under some circumstances.

It is critical that the pressure on the knife-blade cutting-edge be controlled within certain limits. The amount of pressure can readily be changed by changing the spring. However once in operation, the pressure available is not adjustable. Below a certain pressure, near-zero clearance will not be adequately maintained. Too much pressure may induce strains which lead to wear. It has been found that there is a range of pressure which is capable of accommodating a wide variety of different melts. When the elements of the spring mechanism cooperate to produce a pressure of about one to two pounds per linear inch along the knife-blade cutting-edge, satisfactory operation is achieved for the conditions above. For different arrangements, different pressures may be necessary. Simple testing should readily determine the strength of the spring required.

It will be understood that the cutter can have variations and modifications without departing from its essential aspects and still be within the spirit of the invention.

We claim:

1. An improved rotary cutter apparatus for continuously cutting into pellets one or more molten extruded strands emerging continuously from holes in the face of an extruder die, the apparatus adapted to be driven by a rotating drive-shaft, the apparatus having
   a head attachable in axial alignment to the rotating drive-shaft, so that the head rotates with and acts as an extension of the drive-shaft, and
   a plurality of knife-assemblies attached to the head, so that they continuously rotate with the continuous rotation of the head, each knife-assembly having a curved or angled drive-rod portion having a first and a second end, the first end connected to the head radially with respect to the axis of the head, and having a first rotational ability about its axis, and a knife-holder portion axially aligned with and connected to the second end of the drive-rod portion so that the knife-holder portion has a limited but unconstrained axial second rotational ability, the knife-holder portion having a knife-blade with an elongated cutting-edge attached to it, wherein the improvement comprises:
   a plurality of spring means housed within the head, one for each knife-assembly, operating independently in conjunction with each knife-assembly, to urge rotational movement, allowed by the first rotational ability, in a direction whereby near-zero clearance between each knife-blade cutting-edge and the die-face is continuously maintained;
   the second rotational ability providing additional conformity of the knife-blade cutting-edge to the die-face;
   the knife-blade movements possible as a result of the two rotational abilities allowing continuous smooth cutting of the molten strand and limiting the wear of the die-face and knife-blade cutting-edge.

2. The apparatus of claim 1 wherein the angle of rotation associated with the first rotational ability is limited.

3. The apparatus of claim 2 wherein each of the spring means comprises:
   a) a tensioner-pin having a first and a second end, the pin positioned in a surrounding groove in the head, its axis generally in and movable about a plane perpendicular to the cylinder head axis, the first tensioner-pin end attached to the drive-rod portion close to the drive-rod portion's first end, perpendicularly to the axis of the first drive-rod portion end, movement of the tensioner-pin causing rotation of the first drive-rod portion end;
   b) a tensioner having a first and a second end, the tensioner axis aligned generally parallel to the head axis, and lying within a cylindrical chamber having a constricted central portion, the first tensioner end connected pivotally with the second tensioner-pin end;
   c) a coiled spring housed coaxially within the cylindrical chamber, the spring surrounding a portion of the tensioner and positioned from the constriction in the chamber to near the second tensioner end; and
   d) a tensioner-guide attached to and coaxially surrounding the second tensioner end, adjacent to the spring, the guide being of similar diameter to and movable within the cylindrical chamber, its movement allowing, through movement of the tensioner, together with pivotal movement of the tensioner-pin, rotation of the first drive-rod portion end, that rotation urging the knife-blades towards the die-face to maintain near-zero clearance between the knife-blades' cutting-edges and the die-face.

* * * * *